No. 729,653. PATENTED JUNE 2, 1903.
S. W. PARHAM.
FISH TRANSPORTATION CAR.
APPLICATION FILED OCT. 4, 1902.
NO MODEL.
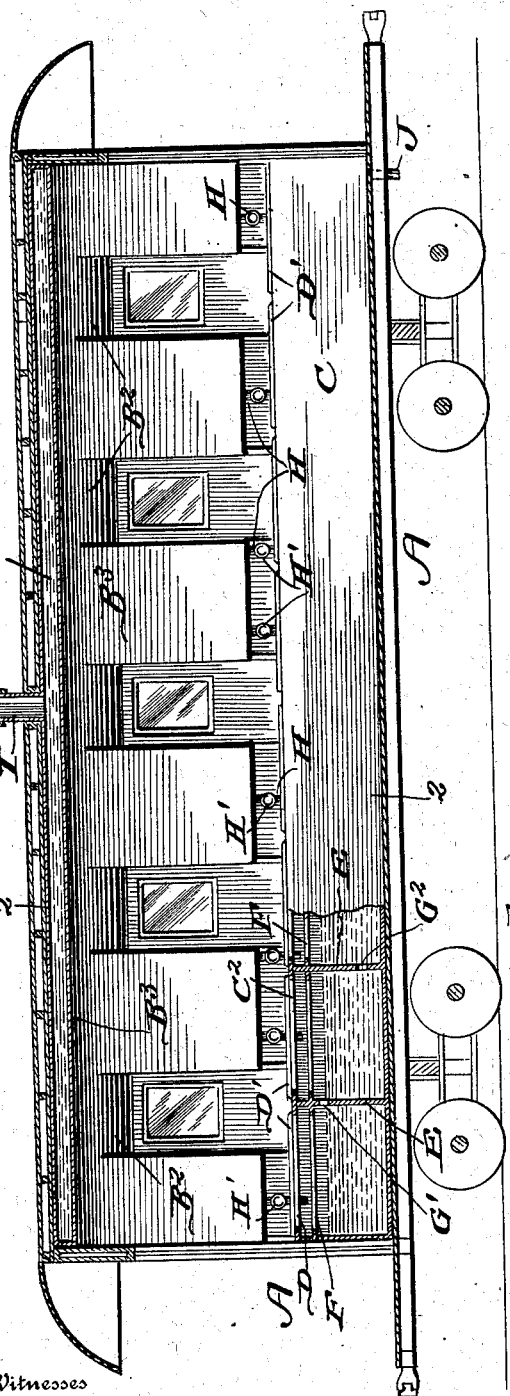
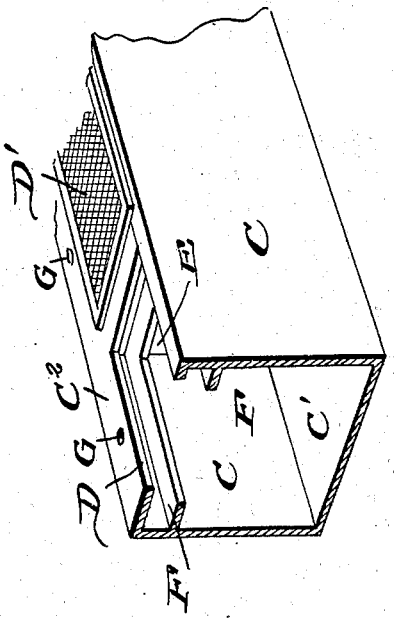
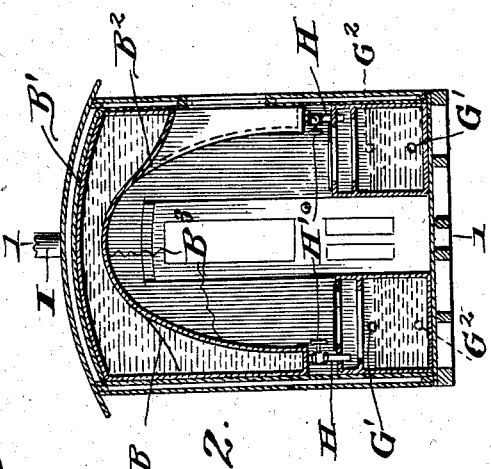
Inventor
S. W. Parham.
Witnesses No. 729,653. Patented June 2, 1903.

UNITED STATES PATENT OFFICE.

SION WEBSTER PARHAM, OF MONROE, NORTH CAROLINA.

FISH-TRANSPORTATION CAR.

SPECIFICATION forming part of Letters Patent No. 729,653, dated June 2, 1903.

Application filed October 4, 1902. Serial No. 125,962. (No model.)

*To all whom it may concern:*

Be it known that I, SION WEBSTER PARHAM, a citizen of the United States, residing at Monroe, in the county of Union and State of North Carolina, have invented a new and useful Fish-Transportation Car, of which the following is a specification.

My invention is an improvement in cars for transporting fish from the seashore to inland towns; and the object is to provide a car by means of which live fish can be readily shipped long distances and found in good condition on arrival at their destination.

While intended for commercial use, the car is also suitable for use in connection with work of the United States Fish Commission, or it can be used to convey live bait from place to place.

Figure 1 is a section about on the line 1 1 of Fig. 2, part of the tanks being broken away. Fig. 2 is a section about on the line 2 2 of Fig. 1. Fig. 3 is a detail perspective view of my improved tank.

In carrying out my invention I employ a car A, which may be of any desired length and gage. In the upper part of this car is located a reservoir B, which runs the length of the car. The top of this reservoir is slightly convex, as at B', conforming to the top of the car A. The bottom of the reservoir forms a reverse curve throughout the portion of the car opposite the windows, as shown at $B^2$; but between the windows of the car the reservoir extends downward on each side, its bottom or inner wall forming an arch $B^3$ over the aisle of the car. On either side of the aisle are arranged a plurality of tanks having the side walls C, bottom C', and top $C^2$, the top being cut away at D and covered with wire-netting D'. The partitions E separate the tanks. Beneath the top $C^2$ is a flange F, running around the inner walls of the tanks, the object of this flange being to prevent water splashing out of the tanks into the aisle. A perforation G is formed in the top of the tanks between the car-windows, and perforations G' $G^2$ are also formed one above the other in the partitions separating the tanks, and these may be covered with gauze or provided with plugs, if desired. Vent-pipes H extend downward from the reservoir and through the perforations G, discharging into the tanks, and each pipe has a suitable valve mechanism H', which may be of any preferred form.

An intake-pipe I is located on the top of the car and provides means for filling the reservoir. A cap I' normally closes it. A discharge-pipe J permits water to be drawn from the tanks.

The operation of my device is evident. Water can be fed into any or all of the tanks from the reservoir, and by slightly opening the discharge-pipe J and permitting an amount of water to enter through the pipes H equal to the amount discharged at J a continuous circulation of fresh water can be kept up in the tanks during the journey of the car, the amount of fresh water supplied and the length of the trip being limited, in the case of salt-water fish, only by the capacity of the reservoir. In case fresh-water fish were being transported, the reservoir could be refilled from the tanks located along the route for supplying engines with water.

Having thus fully described my invention, what I claim as new, and desire to secure by Letters Patent, is—

1. In a fish-car, the combination with a tank positioned in the upper part of the car and running its entire length, a feed-pipe extending above the car, a plurality of tanks arranged on the bottom of the car, pipes leading from the tank in the top of the car to the tanks at the bottom, and a discharge-pipe at the end of the car.

2. In a fish-car, the combination with a plurality of tanks arranged on each side of a car, a wire-netting covering said tanks, an inwardly-projecting flange extending around the inner sides of the tanks adjacent the top, and means for circulating water through the tanks.

SION WEBSTER PARHAM.

Witnesses:
GEO. S. LEE,
JOHN W. TOWNSEND.